United States Patent [19]

Nishiyama et al.

[11] Patent Number: 4,524,044
[45] Date of Patent: Jun. 18, 1985

[54] REACTION INJECTION MOLDING METHOD

[75] Inventors: Masao Nishiyama; Keiichiro Katada; Yoshiteru Akimoto, all of Hirakata, Japan

[73] Assignee: UBE Industries, Ltd., Yamaguchi, Japan

[21] Appl. No.: 533,274

[22] Filed: Sep. 16, 1983

[30] Foreign Application Priority Data

Sep. 30, 1982 [JP] Japan ................. 57-169728

[51] Int. Cl.$^3$ ................................. B29F 1/00
[52] U.S. Cl. .................. 264/328.6; 264/328.13; 264/328.17
[58] Field of Search ............. 264/328.17, DIG. 56, 264/DIG. 83, 328.6, 328.13

[56] References Cited

U.S. PATENT DOCUMENTS 3,268,635  8/1966  Kraus et al. ................. 264/53
4,107,258  8/1978  Angell, Jr. et al. ........... 264/328.13
4,229,395  10/1980  Nagumo et al. ............. 264/DIG. 83

FOREIGN PATENT DOCUMENTS 1467792  2/1966  France .................. 264/DIG. 56

OTHER PUBLICATIONS

The Development of Non-Urethane Materials for the Rim Process, R. Kubiak and R. Harper, 45th Annual Tech. Conference, Society of Plastics Ind. Inc., 1980, pp. 1-7.
Ionically Polymerized Lactams (Polyamides), Dr. Kurt Schneider, Kunststoffe, vol. 55, May 1965, pp. 315-316.

Primary Examiner—Donald Czaja
Assistant Examiner—V. Fischbach
Attorney, Agent, or Firm—Burgess, Ryan & Wayne

[57] ABSTRACT

A molded article is formed by a reaction injection molding method wherein a starting material, e.g., an ω-lactam, is injected into a mold, the inner pressure of which is maintained at 0.5 to 20 kg/cm$^2$·G with an inert gas; and the inner pressure of the mold is maintained at a level higher than the pressure increased by injection of the starting material until the polymerization molding of the starting material is completed.

7 Claims, 1 Drawing Figure

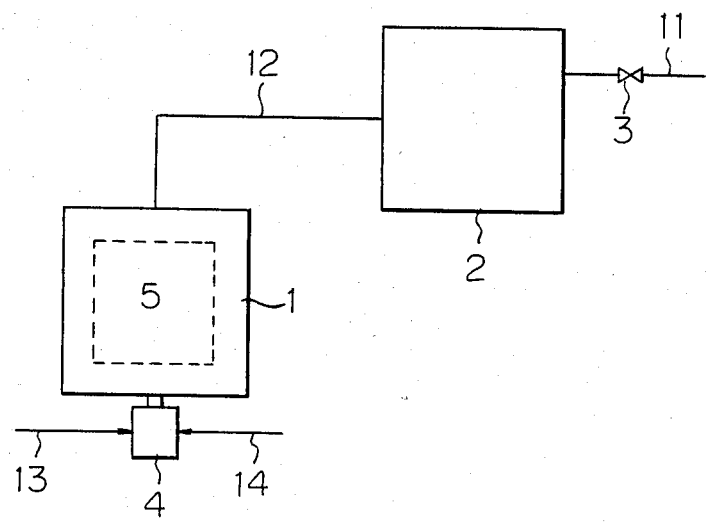

REACTION INJECTION MOLDING METHOD

BACKGROUND OF THE INVENTION (1) Field of the Invention

This invention relates to a reaction injection molding method.

(2) Description of the Prior Art

A reaction injection molding method, namely, a method for obtaining a molded article of a plastic material such as nylon, unsaturated polyester, epoxy or polyurethane by injecting a highly reactive liquid starting material into a mold and effecting polymerization and molding in the mold. In this reaction injection molding method, at least two highly reactive liquid starting materials are ordinarily mixed together by causing them to impinge against each other in a mixing head and then injected into a mold. However, since air bubbles are involved in the starting materials when they are mixed together by impingement, these bubbles are readily left within the resulting molded article. Furthermore, since the liquid starting material is polymerized and molded in the mold, the density varies during the polymerization or the polymerization reaction is advanced non-uniformly, with the result that the surface smoothness of the obtained molded article is readily degraded.

SUMMARY OF THE INVENTION

It is the primary object of the present invention to provide a reaction injection molding method which does not have the problems of the known reaction injection molding method and by which a molded article which is substantially free of air bubbles in the interior thereof and having a good surface smoothness can be obtained.

In accordance with the present invention, there is provided a method for forming a molded article by reaction injection molding, which comprises injecting a starting material into a mold, the inner pressure in which is maintained at 0.5 to 20 kg/cm$^2$·G with an inert gas and maintaining the inner pressure in the mold at a level higher than the pressure increased by injection of the starting material until the polymerization molding of the starting material is completed.

BRIEF DESCRIPTION OF THE DRAWING

The drawing diagrammatically illustrates one embodiment of the method of the present invention.

DESCRIPTION OF THE PREFERRED EMBODIMENTS

The present invention may be applied to reaction injection molding of nylon, unsaturated polyester, epoxy resin and polyurethane. Especially, the reaction injection molding method of the present invention is suitable for producing a nylon molded article from ω-lactam.

The present invention will now be described in detail with reference to the reaction injection molding of ω-lactam as a typical embodiment.

As the ω-lactam to be subjected to the polymerization, there can be mentioned, for example, γ-butyrolactam, δ-valerolactam, ε-caprolactam, ω-enantholactam, ω-capryl lactam, ω-undecanolactam and ω-lauryl lactam. These ω-lactams may be used alone or in the form of a mixture of two or more of them.

As the alkali catalyst, there can be used all of compounds used in the known methods of the alkali polymerization of ω-lactams. For example, there can be mentioned alkali metals and alkaline earth metals, their hydrides, oxides, hydroxides, carbonates, alkylated products, alkoxides and grignard compounds, sodium naphthalene, and reaction products of the above-mentioned metals or metal compounds with ω-lactams, such as sodium and potassium salts of ω-lactams. It is preferred that the alkali catalyst be used in an amount of 0.05 to 10 mole %, more preferably 0.2 to 5 mole %, based on the ω-lactam.

All of cocatalysts used in the known alkali polymerization methods can be used in the present invention. For example, there can be mentioned N-acyl lactams, organic isocyanates, acid chlorides, acid anhydrides, esters, urea derivatives, carbodiimides and ketenes. The cocatalysts are used in an amount of 0.01 to 5 mole % based on the ω-lactam.

Furthermore, reaction products of the above cocatalysts with polyols, polyamines or polycarboxylic acids, which have an cocatalyst action, can also be used as the cocatalyst. For example, there can be mentioned reaction products of isocyanates such as hexamethylene diisocyanate and 4,4'-diphenylmethane diisocyanate with polyols such as polyethylene glycol, polypropylene glycol, polytetramethylene glycol, polybutadiene glycol, polyester glycol and poly(ε-caprolactone)diol, polyamines such as polyoxyethylene diamine, polyoxypropylene diamine and amino-terminated polyamides, or polyethylene hydroxydiglycolic acid or carboxyl-terminated polybutadiene or polyamides. Reaction products of acyl lactams such as adipoyl bis-caprolactam and terephthaloyl bis-caprolactam or carbamidolactams such as hexamethylene-1,6-bis-carbamidolactam and N-phenyl-N'-isopropyl-p-phenylene-bis-carbamidolactam with the above-mentioned polyols or polyamines can also be mentioned. When these reaction products are used as the cocatalyst, the amount thereof is 1 to 60% by weight based on the ω-lactam.

The polymerization of an ω-lactam is carried out at a temperature not lower than the melting point of the ω-lactam but lower than the melting point of the formed polyamide.

In the present invention, the polymerization of an ω-lactam may be carried out in the presence of a plasticizer, a filler, a fiber, a blowing agent, a dye, a pigment or a stabilizer such as an antioxidant, which does not substantially inhibit the polymerization reaction. N-alkylpyrrolidone or dialkylimidazolidinone is preferred as the plasticizer, and the plasticizer is used in an amount of 2 to 25% by weight based on the ω-lactam. As the filler, there can be mentioned calcium carbonate, wollastonite, kaolin, graphite, gypsum, feldspar, mica, asbestos, carbon black and molybdenum disulfide. As the fiber, there can be mentioned glass fiber such as milled glass (pulverized glass), graphite fiber, a fibrous magnesium compound, potassium titanate fiber, mineral fiber, boron fiber and steel fiber. The filler or fiber may be used in an amount of 2 to 50% by weight based on the ω-lactam. As the blowing agent, benzene, toluene and xylene are preferably used, and the amount thereof is 1 to 15% by weight based on the ω-lactam.

The present invention will now be described with reference to the accompanying drawings diagrammatically showing one embodiment thereof.

Prior to injection of starting materials, an inert gas for example, a nitrogen gas is introduced into a mold 1 through a pipe 11, a gas trap 2 and a pipe 12 to an extent such that the inner pressure of the mold reaches 0.5 to 20 kg/cm$^2$·G, preferably 1 to 10 kg/cm$^2$·G. If the inner pressure within the mold 1 is lower than 0.5 kg/cm$^2$·G, air bubbles are contained in the final molded article. Even if the inner pressure within the mold 1 exceeds 20 kg/cm$^2$·G, no substantial further improvement of the intended effect is attained but the manufacturing cost of the mold is increased, resulting in industrial disadvantages. When the inner pressure in the mold 1 reaches a predetermined level, a valve 3 is closed.

A molten ω-lactam containing an alkali catalyst and a molten ω-lactam containing a cocatalyst are supplied to a mixing head 4 through pipes 13 and 14, respectively, where they are caused to impinge against each other to be thereby mixed together. The mixture is injected into a cavity 5 of the mold 1 pre-heated at a predetermined polymerization temperature. It is preferred that the starting materials be injected into the cavity through a gate provided in the lower portion of the mold. There may be adopted a method in which the alkali catalyst and cocatalyst are incorporated into the molten ω-lactam and then the mixture is immediately injected into the cavity 5, though this method is not always preferable. Thus, the polymerization molding of the ω-lactam is accomplished in the cavity 5.

The inner pressure in the mold 1 is increased by injection of the starting material into the cavity 5, but since the cavity 5 is connected to the gas trap 2 through the pipe 12, excessive increase of the inner pressure in the mold 1 is prevented. If the inner pressure in the mold 1 is excessively increased, in order to increase the inner pressure for injection of the starting material, it is necessary to employ the injection apparatus of a large size, resulting in industrial disadvantages. The inner volume of the gas trap 2 is preferably at least 3 times the inner volume of the cavity 5. Instead of the gas trap, there may be disposed a relief valve to be actuated when the pressure reaches a predetermined level, between the pipes 11 and 12.

In order to obtain a nylon molded article free of air bubbles in the interior and having a smooth surface, it is necessary that the inner pressure in the mold 1 should be maintained at a level higher than the pressure increased by injection of the ω-lactam-containing starting material until polymerization molding of the starting material is completed. The upper limit of the pressure imposed on the interior of the mold varies depending upon the shape of the desired molded article, but is ordinarily 50 kg/cm$^2$·G. Maintenance of the pressure in the mold 1 at a level higher than the pressure increased by injection of the starting material can be accomplished by opening the valve 3 after injection of the starting material into the cavity 5 to introduce a compressed inert gas from the pipe 11 until a desired pressure is attained.

After completion of the polymerization molding of the ω-lactam, a nylon molded article is taken out from the mold 1.

The present invention will now be described in detail with reference to the following examples and comparative examples, wherein the apparatus shown in the drawing is employed.

EXAMPLE 1

Two components having the compositions described below were prepared and maintained at 110° C.

| Component A: | |
| --- | --- |
| ε-Caprolactam | 500 g |
| Sodium caprolactam | 9.6 g |
| Component B: | |
| ε-Caprolactam | 300 g |
| Hexamethylene diisocyanate | 21 g |
| Polyoxypropylene diamine (Jeffamine D-2000 supplied by Jefferson Chemical Co.) | 200 g |

A valve 3 attached to a pipe 11 connected to a gas trap 2 (having an inner volume of about 2000 cc) was opened to increase the inner pressure in a mold 1 (having an inner volume of 700 cc) pre-heated at 145° C. to 1 kg/cm$^2$·G with a nitrogen gas, and then, the valve 3 was closed. Then, 350 cc each of the components A and B were metered and supplied to a mixing head 4 attached to the lower portion of the mold, where they were caused to impinge against each other under a pressure of about 30 kg/cm$^2$·G and to be thereby mixed together and then the mixture was injected into the mold 1. The inner pressure in the mold 1 was increased to about 1.6 kg/cm$^2$·G by injection of the mixture. Thereafter, the valve 3 was opened to increase the inner pressure in the mold 1 to 2 kg/cm$^2$·G with a nitrogen gas and then, the valve 3 was closed. The inner pressure in the mold 1 was maintained at 2 kg/cm$^2$·G until molding was completed. After passage of about 5 minutes, the resulting molded article was taken out from the mold 1. The obtained molded article was free of air bubbles in the interior thereof and the surface smoothness was very good.

COMPARATIVE EXAMPLE 1

Procedures of Example 1 were repeated in the same manner except that the pressure was not applied to the interior of the mold 1 prior to injection of the starting material. The obtained molded article contained innumerable air bubbles in the interior thereof, and the surface included protrusions and recesses and the surface smoothness was bad.

EXAMPLE 2

Two components having compositions described below were prepared and maintained at 100° C.

| Component A: | |
| --- | --- |
| ε-Caprolactam | 500 g |
| Sodium caprolactam | 9.6 g |
| Milled glass fiber (Short Fiber ES25T supplied by Unitica UM Glass Co.) | 100 g |
| Component B: | |
| ε-Caprolactam | 300 g |
| 4,4'-Diphenylmethane-biscarbamidocaprolactam | 59.5 g |
| Polyoxypropylene diamine | 200 g |
| Milled glass fiber (Short fiber ES25T) | 100 g |

Procedures of Example 1 were repeated in the same manner except that the inner pressure in the mold 1 before injection of the starting material was maintained at 3 kg/cm$^2$·G and the inner pressure in the mold 1 after injection of the starting material was maintained at 5 kg/cm$^2$·G. The obtained molded article was free of air bubbles in the interior thereof and the surface smoothness was very good.

We claim:

1. A process for forming a molded article by reaction injection molding, comprising the steps of:
   pressurizing a mold cavity by filling the cavity with an inert gas at a pressure in the range of 0.5 to 20 kg/cm$^2$·G;
   injecting into said pressurized cavity starting material capable of reacting to form a polymerized material, the injection of said starting material compressing said gas to increase the pressure within said cavity to a given value; and
   after injection of said starting material, raising the pressure of the gas within said cavity to an elevated value higher than said given value, and maintaining the pressure within said cavity at said elevated value until the polymerization molding of the starting material is completed.

2. A method according to claim 1 wherein the inner pressure in the mold into which the starting material is injected is maintained at 1 to 10 kg/cm$^2$·G.

3. A metnod according to claim 1 wherein the starting material comprises an ω-lactam.

4. A method according to claim 1 wherein the starting material is a mixture of an ω-lactam, 0.05 to 10% by mole, based on the ω-lactam, of an alkali catalyst and 0.01 to 5% by mole, based on the ω-lactam, of a cocatalyst selected from the group consisting of N-acyl lactams, organic isocyanates, acid chloride, acid anhydrides, esters, urea derivatives, carbodiimides and ketenes, or 1 to 60% by weight, based on the ω-lactam, of a cocatalyst selected from the group consisting of reaction produts of the above-listed cocatalysts with a polyol, a polyamine or a polycarboxylic acid.

5. A method according to claim 3 therein the polymerization molding of the ω-lactam is carried out at a temperature not lower than the melting point of the ω-lactam but lower than the melting point of the formed polyamide.

6. A method according to claim 1 wherein the level of the inner pressure in the mold maintained during the polymerization molding is not higher than 50 kg/cm$^2$·G.

7. The process according to claim 1, wherein the pressure of the gas within said cavity is raised to said elevated value by introducing additional inert gas into said cavity.

* * * * *